F. A. ILLINGWORTH.

Improvement in Car Couplings.

No. 4,983. Reissued July 16, 1872.

Witnesses:

John Becker.

Francis McAndle.

Inventor:

F. A. Illingworth

PER

Attorneys.

AM. PHOTO-LITHOGRAPHIC CO. N.Y. (OSBORNE'S PROCESS)

UNITED STATES PATENT OFFICE.

FREDERICK A. ILLINGWORTH, OF WALTHAM, MASSACHUSETTS, ASSIGNOR OF ONE-HALF INTEREST TO ALBERT J. WRIGHT, JR.

IMPROVEMENT IN CAR-COUPLINGS.

Specification forming part of Letters Patent No. 122,175, dated December 26, 1871; reissue No. 4,983, dated July 16, 1872.

*To all whom it may concern:*

Be it known that I, FREDERICK A. ILLINGWORTH, of Waltham, in the county of Middlesex and State of Massachusetts, have invented certain Improvements in Car-Couplings, of which the following is a full, clear, and exact description, reference being had to the accompanying drawing making part of this specification, in which—

Figure 1:
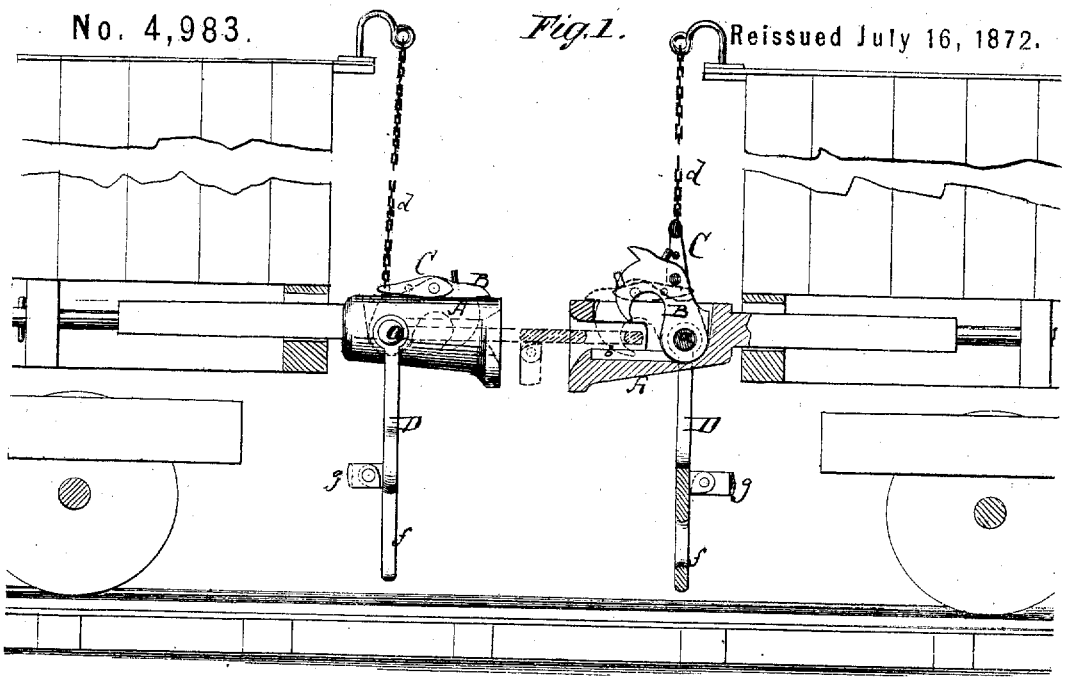
Figure 2:
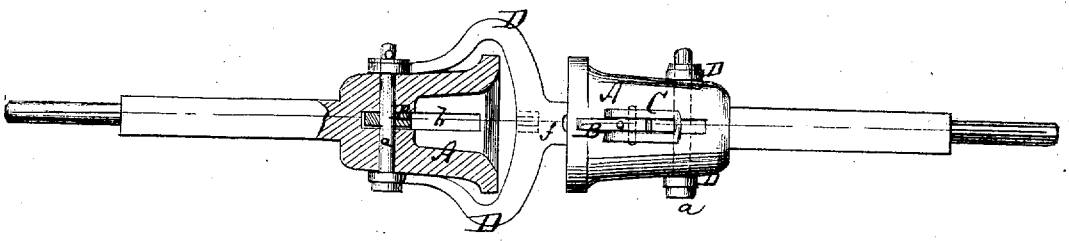
Figure 3:
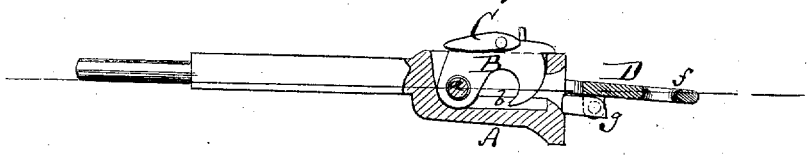

Figure 1 is a side view and longitudinal vertical section of my improved car-coupling. Fig. 2 is a plan and horizontal section of the same. Fig. 3 is a longitudinal section of the same, showing the coupling-hook let down.

This invention has for its object to bring all the parts of a car-coupling under more perfect control, and at the same time insure greater reliability than heretofore. The invention consists, first, in poviding the pivoted coupling-hook with a prop or device whereby it can be held up clear of the link or shackle, or let down, at will. The invention also consists in the new arrangement of a pivoted connecting-shackle, which has also a prop, whereby it can be held in a horizontal position ready for coupling. Furthermore, the invention consists in the general new arrangement of parts as hereinafter more fully described.

To enable others skilled in the art to understand and use my invention, I will proceed to describe the manner in which I have carried it out.

In the said drawing, A represents the draw-head, made of cast-iron or other suitable material, of proper form and size, with a flaring mouth or entrance for the coupling-link or shackle. B is the coupling-hook, pivoted by a horizontal pin, *a*, to the interior of the head A, the pivot A being below the line of draft, so that the hook will not swing up when draft is applied. The hook projects into the head A through a slot in the upper part of the latter, and does, when swung down to the greatest extent, as in Fig. 3, enter a groove, *b*, in the bottom of the draw-head. To the upper part of the hook B is pivoted a prop, C, which serves, when swung into a vertical position, to sustain the hook elevated, as in Fig. 1, preventing it from coupling. A chain, rope, or rod, *d*, connected wth the prop C, is used to pull the same up; also to raise the hook for uncoupling. When the raised prop C is to be let down, the chain, rope, or rod *d* is drawn slightly back, which will cause the prop to swing slightly and allow the hook B to drop. D is the coupling-shackle. It is somewhat like a letter Y in shape, its forked back being, by the pin *a*, pivoted to the draw-head A, while its front arm, *f*, is slotted for the reception of the hook B, as indicated by dotted lines in Fig. 1. This shackle, when not in use, can hang down vertically from the draw-head. It has a pivoted prop, *g*, which can be used to sustain the shackle in a horizontal position, as in Fig. 3, the prop bearing on the lower inclined surface of the mouth of the draw-head, as shown.

In coupling, the shackle is thus held up by its own prop *g*. When the cars meet, the arm *f* of the shackle will enter the opposite draw-head and raise the hook B, which drops through the slot in the arm *f*, thus securing automatic connection. The cars can be uncoupled by pulling the chain *d*, which raises the hook B clear of the shackle. When the draw-heads of two cars are of unequal height the shackle D can be raised or lowered, as desired, to enter the opposite draw-head, thereby avoiding the necessity of using a bent link, as heretofore required in such cases. Ordinary coupling-links can also be used for connecting cars having common draw-heads with such provided with my improved coupling.

*Claim.*

What I claim as my invention, and desire to secure by Letters Patent, is—

1. The combination of the draw-head A, pivoted hook B, and prop C, above the draw-head, operating substantially as described.

2. The prop *g*, in combination with the shackle D, pivoted to the draw-head, substantially as and for the purpose set forth.

Witness my hand this 14th day of May, A.D. 1872.

FREDERICK A. ILLINGWORTH.

In presence of—

P. E. TESCHEMACHER,

N. W. STEARNS.